United States Patent [19]

Gutter et al.

[11] Patent Number: 4,739,126
[45] Date of Patent: Apr. 19, 1988

[54] PANEL MOUNT GROUND TERMINATION APPARATUS

[75] Inventors: David H. Gutter; Walter C. Shatto, Jr., both of Harrisburg, Pa.

[73] Assignee: AMP Incorporated, Harrisburg, Pa.

[21] Appl. No.: 3,979

[22] Filed: Jan. 16, 1987

[51] Int. Cl.⁴ .............................................. H02G 15/00
[52] U.S. Cl. .................................. 174/65 SS; 174/78; 439/98; 439/394
[58] Field of Search ................. 174/65 R, 65 SS, 51, 174/78; 439/98, 391, 394

[56] References Cited

U.S. PATENT DOCUMENTS 3,744,007 7/1973 Horak ................................. 439/394
4,120,554 10/1978 Bianchi et al. .
4,273,405 6/1981 Law ................................... 439/98 X Primary Examiner—Arthur T. Grimley
Assistant Examiner—David A. Tone

[57] ABSTRACT

Panel-mount ground termination apparatus for terminating the outer shielding conductor of an electrical cable and for simultaneously mounting the cable to a panel. The apparatus includes a housing mounted to the panel and having an axial aperture for receiving the cable to be terminated; a flexible termination member having a plurality of inwardly extending, electrically conductive prongs positioned within the housing aperture and surrounding the cable; a compression member having a tapered, inner compression surface; and a housing closure member threadable onto the housing. As the closure member is threaded onto the housing, the compression member is urged into the housing aperture between the outer surface of the termination member and the sidewall of the housing aperture. The tapered compression surface of the compression member engages the outer surface of the termination member, compressing the termination member inwardly and driving the plurality of prongs into the cable and into engagement with the outer conductor of the cable. The prongs are preferably arranged in pairs, and the termination member includes curved surface portions which deform as the prongs are driven into the cable, causing the prongs of each prong pair to turn toward one another to firmly retain the outer conductor therebetween.

4 Claims, 2 Drawing Sheets

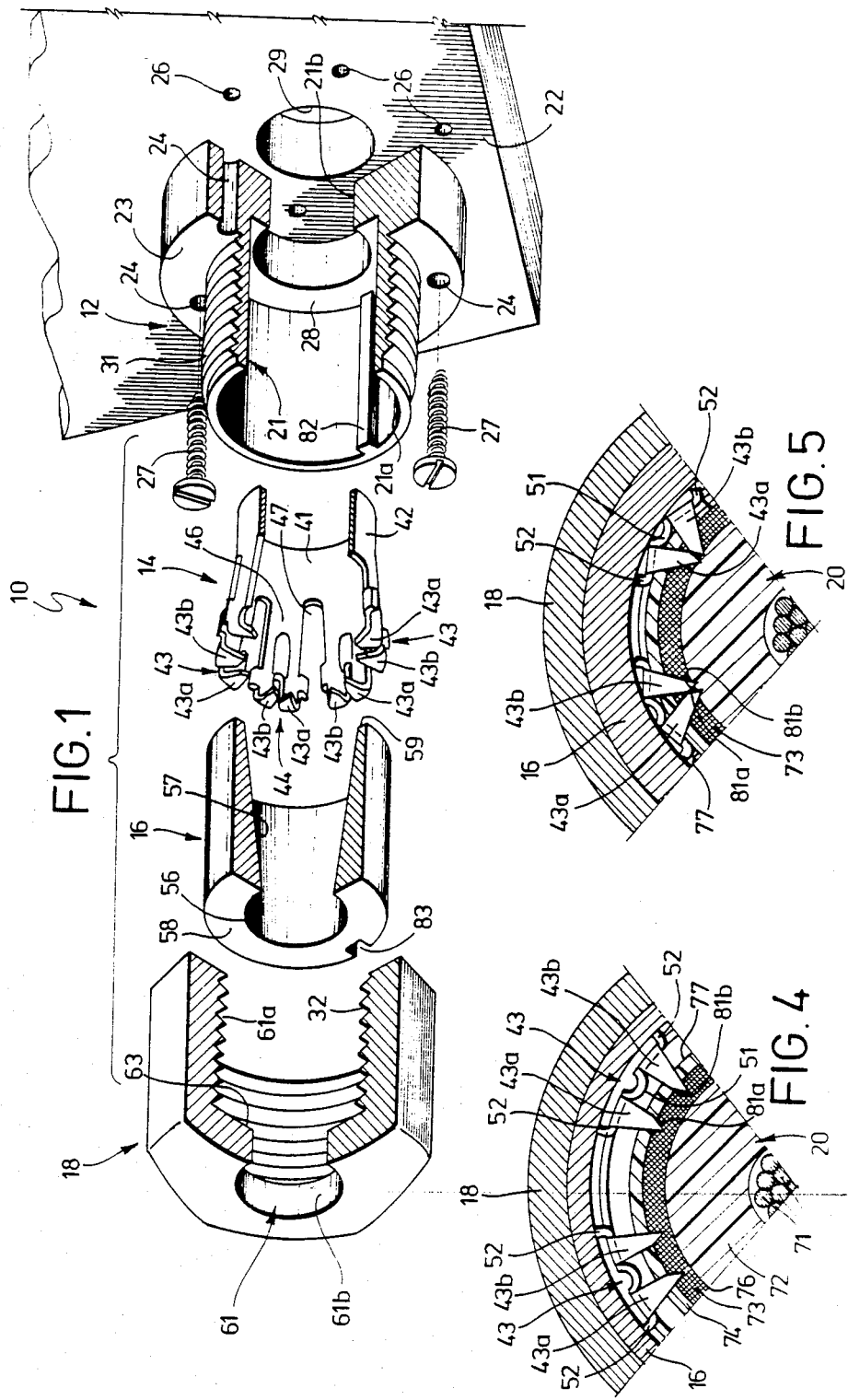

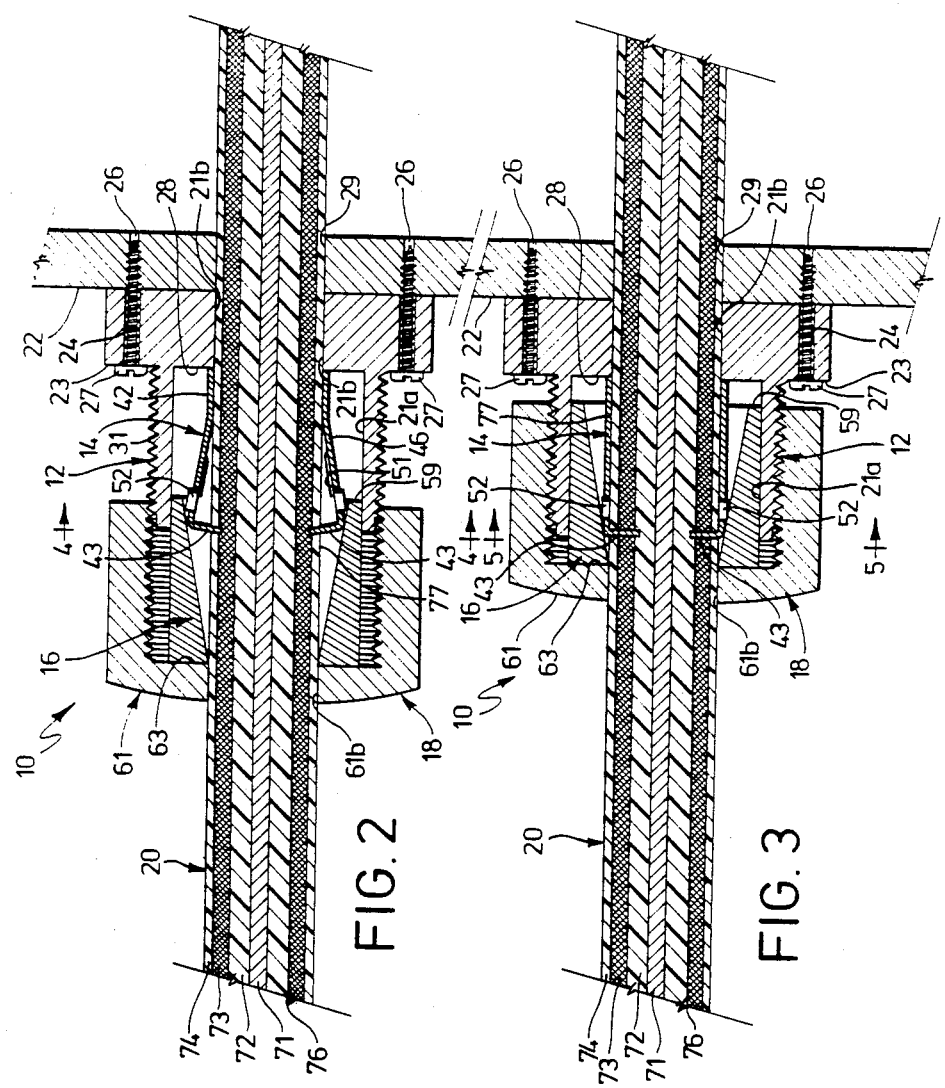

PANEL MOUNT GROUND TERMINATION APPARATUS

BACKGROUND OF THE INVENTION

The present invention relates to apparatus for terminating electrical cables and, more particularly, to a panel-mounted grounding apparatus for terminating the outer shielding conductor of an electrical cable.

Shielded electrical cables having one or a plurality of signal-carrying center conductors surrounded by one or more tubular-shaped, braided outer conductors are used in applications wherein shielding is desired to reduce electromagnetic interference of the signals transmitted by the cable. Shielded cables are often used to transmit signals from remote locations to processing circuitry located within a housing or other enclosure; and, in such applications, it is desirable to dissipate the noise carried on the outer shielding conductor of the cable prior to entrance of the cable into the enclosure and into the circuitry, as any noise present on the outer conductor can interfere with the electronics in the circuitry. Power cables also frequently include an outer conductor coaxially encompassing other conductors of the cable to provide a protective ground.

Various devices have been used to ground the outer shielding conductor of a cable. Many prior devices were not satisfactory because it was necessary to cut through the cable or to otherwise prepare the cable for receipt of the grounding structure.

In one known grounding device, the braided outer conductor of a cable was grounded by electrically conductive contact tips or prongs extended through the outer jacket of the cable into contact with the outer conductor. The prongs were mounted on or affixed to an external grounding structure to provide a grounding path from the prongs to external ground to dissipate noise carried by the outer conductor.

In another known grounding device, a pair of contact prongs was mounted on a deformable support plate so that the prongs were embedded within the cable by pressing the plate and cable together. The support plate deformed to conform to the curvature of the cable, causing the embedded tips of the prongs to turn toward one another to grab and retain the braided conductor therebetween.

Such known devices have not been fully satisfactory. In such devices, only a few prongs were inserted into the cable, and the inserted prongs were disposed in such a manner that the outer conductor was not reliably grounded. In such devices also, a separate fixture was needed to insert the prongs into the cable; and such specialized equipment increased manufacturing costs and was inconvenient to the user.

SUMMARY OF THE INVENTION

The present invention provides apparatus for automatically terminating an outer conductor of an electrical cable when the cable is mounted to a panel, for example, the wall of an enclosure into which the cable is extended. The apparatus comprises a housing having a cylindrical aperture for receiving the cable to be terminated; a termination member positioned within the housing aperture and surrounding at least a portion of the cable, the termination member including a plurality of electrically conductive contacts thereon; a compression member having a compression surface for engaging the termination member; and means for urging the compression member into the housing aperture between the sidewall of the aperture and the termination member, the compression surface engaging the termination member and compressing the termination member inwardly for driving the plurality of electrically conductive contacts into the cable and into electrical contact with the outer conductor for terminating the outer conductor.

In a preferred embodiment of the invention, the housing comprises an annular fitting mounted to a panel through which the cable is to extend. The termination member comprises an annular, spring-like member surrounding the cable and having a plurality of pairs of inwardly extending, electrically conductive contact prongs around its circumference. The compression member comprises a tubular-shaped element having a conical passageway extending therethrough defining a tapererd, inner compression surface adapted to engage the outer surface of the termination member during insertion of the compression member into the housing aperture between the compression member and the sidewall of the housing aperture. The means for urging the compression member into the housing aperture comprises a closure member threadable onto the housing.

As the closure member is threaded onto the housing, the closure member urges the compression member into the housing, and the tapered compression surface engages the outer surface of the annular termination member and compresses the termination member inwardly driving the plurality of prongs into the cable and into electrical contact with the outer conductor of the cable.

When the closure member is fully threaded onto the housing, the compression member is completely positioned within the housing; the prongs are fully embedded within the cable; and the apparatus and the cable extending therethrough is firmly mounted to the panel. The compression member and the housing are both formed of electrically conductive materials to provide a grounding path from the outer conductor to the panel on which the housing is mounted.

The plurality of prongs is preferably arranged in parts, and the termination member is formed to include curved surface portions which are engaged by the compression surface of the compression member and by the outer surface of the cable as the prongs are driven into the cable. The curved surface portions are deformed during compression of the termination member, causing the two prongs in each prong pair to turn toward one another such that their tips firmly grab and retain the braided outer conductor of the cable therebetween.

The apparatus of the present invention functions both as a ground termination for the outer conductor of a cable and as a mounting apparatus for mounting the cable to a panel. The outer conductor of the cable is automatically grounded upon attachment of the cable to the panel without any preliminary cable preparation being necessary and without needing a separate grounding fixture as in prior systems.

Further advantages and specific details of the invention will be set forth hereinafter in conjunction with the following detailed description of a presently preferred embodiment.

BRIEF DESCRIPTION OF THE DRAWINGS

FIG. 1 is an exploded perspective view of a panel-mount ground termination apparatus according to a presently preferred embodiment of the invention;

FIG. 2 is a longitudinal cross-sectional view of the apparatus of FIG. 1 in partially assembled form;

FIG. 3 is a longitudinal cross-sectional view of the apparatus of FIG. 1 in fully assembled form;

FIG. 4 is a transverse cross-sectional view of the partially assembled apparatus of FIG. 2 looking in the direction of arrow 4—4 in FIG. 2; and FIG. 5 is a transverse cross-sectional view of the fully assembled apparatus of FIG. 3 looking in the direction of arrow 5—5 in FIG. 3.

DETAILED DESCRIPTION OF THE PREFERRED EMBODIMENT

FIGS. 1-5 illustrate a panel-mount ground termination apparatus according to a preferred embodiment of the invention for terminating the outer shielding conductor of an electrical cable. The apparatus is generally designated by reference numeral 10, and comprises an assembly consisting of a housing 12, a termination member 14, a compression member 16, and a closure member 18. Housing 12 comprises a tubular-shaped member of electrically conductive material and has an axial passageway or aperture 21 through which a cable 20 to be terminated is adapted to extend as shown in FIGS. 2 and 3. Housing 12 comprises a fitting adapted to be mounted to a panel 22, which may comprise a wall of an enclosure containing electrical circuitry to which the cable is to be connected. More particularly, housing 12 includes a radial flange 23 having a plurality of apertures 24 therein adapted to be aligned with apertures 26 in the panel to receive mounting screws 27 or the like to securely mount the housing to the panel.

Axial aperture 21 in housing 12 is of cylindrical shape and includes a first aperture portion 21a and a second aperture portion 21b defining an internal ledge or shoulder 28 therebetween. Aperture portion 21b is adapted to be aligned with an opening 29 extending through the panel 22 and is of approximately the same diameter as the cable to be terminated. Aperture portion 21a is of a somewhat larger diameter to receive, in addition to the cable, the termination member 14 and the compression member 16 as will be described hereinafter. Housing 12 includes a threaded outer surface portion 31 to mate with a threaded internal surface portion 32 on closure member 18 during assembly of the apparatus.

Termination member 14 comprises a tubular-shaped member formed of electrically conductive metal such as plated, hardened steel or another flexible, conductive material. Termination member 14 has an inner surface 41 and an outer surface 42, and includes a plurality of integral, pointed contact tips or prongs 43a and 43b which extend inwardly from the upper end 44 thereof. Prongs 43a and 43b preferably extend around the entire circumference of the termination member and, as best shown in FIGS. 4 and 5, are arranged in pairs with one prong 43a and one prong 43b defining a prong pair 43. The prongs 43a and 43b have a length sufficient to extend through the outer jacket of the cable to and through the outer conductor, but insufficient to reach the center conductors carried within the outer conductor of the cable as is best illustrated in FIG. 5.

As shown in FIGS. 1-3, termination member 14 is formed to define a plurality of elongataed resilient finger elements 46 which extend longitudinally along a substantial portion of the length of the termination member and which are defined by a plurality of elongated slots 47 extending to end 44 of the member. A prong pair 43 is formed integral with each finger element 46 and extends inwardly of the termination member from end 44 thereof. As best shown in FIG. 4, each finger element 46 includes an inwardly facing, convex surface portion 51 positioned generally between the two prongs 43a and 43b, and a pair of outwardly curved end portions 52 on each side thereof. As will be explained hereinafter, during assembly of the apparatus, compression member 16 is adapted to engage end portions 52; and the outer surface of the cable is adapted to engage convex surface portion 51 to deform the fingers 46 and cause the prongs 43a and 43b to turn towards one another after being embedded within the cable to retain the braided outer conductor of the cable therebetween.

Compression member 16 comprises a tubular-shaped member having a conical-shaped axial passageway 56. Passageway 56 defines a tapered compression surface 57 which tapers outwardly from outer end 58 to inner end 59 of compression member 16. Closure member 18 comprises a tubular-shaped member having an internal axial passageway 61. Passageway 61 includes passageway portion 61a of enlarged diameter and passageway portion 61b of reduced diameter defining an internal shoulder 63 therebetween. Enlarged passageway portion 61a is internally threaded at 32 to mate with externally threaded portion 31 of housing 12. Passageway portion 61b is approximately the same size as aperture pportion 21b of housing 12 to receive the cable to be terminated, and enlarged passageway portion 61a is sized to fit over the housing 12 during assembly of the apparatus. As will be explained hereinafter, internal shoulder 63 functions as a drive surface to urge the compression member 16 into the housing 12 during assembly of the apparatus.

Housing 12, compression member 16, and closure member 18 are all formed of a sturdy, rigid, electrically conductive material such as steel.

Cable 20 comprises a plurality of discrete center wires 71 surrounded by a buffer layer 72, a spiral wrap layer 76, an outer conductor 73, and an outer jacket 74. Cable 20 is intended to be exemplary only of shielded cable constructions. The cable termination strap of the present invention may be used to terminate coaxial and triaxial cables of numerous forms, and the described example of its application is not intended to limit the invention to any particular cable construction.

Outer conductor 73 comprises a tubular, braided conductor which surrounds the center wires 72. Outer conductor 73 functions as an electromagnetic shield to reduce electromagnetic coupling between the signals carried by the center wires 71 and the surrounding environment. As will be further explained hereinafter, apparatus 10 provides a ground connection from the outer conductor 73 to external ground. Apparatus 10 can be used, for example, to dissipate the noise carried on the outer conductor of a triaxial cable. By using such apparatus, the noise on the outer conductor of a triaxial cable can be dissipated prior to entry of the cable into an enclosure for signal-processing circuitry. Such apparatus can also be used to provide a protective electrical ground on power cables.

Assembly of the apparatus 10 is illustrated in FIGS. 2-5, FIGS. 2 and 4 illustrating the apparatus in the process of being assembled, and FIGS. 3 and 5 illustrating the apparatus in fully assembled form. Housing 12 is first mounted to panel 22 by extending screws 27 through aligned apertures 24 and 26 in the housing and panel, respectively. The closure member 18, the compression member 16, and the termination member 14 are then slid over the end of cable 20 in that order; and the cable end is extended through aperture 21 of the housing 12 and through opening 29 of the panel into the enclosure containing electronic circuitry to be connected to the cable.

Termination member 14 is then slid back along the cable 20 and into enlarged aperture portion 21a of housing 12 until it comes to rest on internal shoulder 28 of the housing. Termination member 14 is sized such that it will fit rather loosely around the cable 20 and fits fully within aperture portion 21a of housing 12 as shown in FIGS. 2 and 3.

Closure member 18 is then slid back along the cable until it engages the housing 12, and is then rotated to thread the closure member onto the housing. As the closure member is threaded onto housing 12, internal drive surface 63 of closure member 18 will engage outer end 58 of the compression member 16 and urge the compression member 16 into enlarged aperture portion 21a of housing 12 between the sidewall of aperture portion 21a and the outer surface 42 of termination number 14. As the closure member 18 is threaded onto housing 12, the compression member 16 is urged into the housing 12, causing compression surface 57 to engage the outer surface 42 of the termination member 14. Due to the taper of the compression surface 57, the surface gradually compresses the termination member inwardly to drive the contacts 43a and 43b into the cable 20 and into contact with the braided outer conductor 73 of the cable. The thickness of the compression member at outer end 58 is such that when the compression member is urged fully into aperture portion 21a of housing 12, i.e., when closure member 18 is fully threaded onto housing 12, the contacts 43a and 43b will be fully embedded in the cable 20, as shown in FIGS. 3 and 5.

With reference to FIGS. 4 and 5, as the termination member 14 is compressed inwardly by compression member 16, the inwardly convex surface portion 51 of each finger portion 46 of termination member 14 engages the outer surface 77 of the cable 20; and the outwardly curved end portions 52 of the finger portions 46 engage the compression surface 57. Initially, the contacts are driven radially into the cable. Continued threading of the closure member 18 onto the housing 12, however, increases the force applied to the ends 52 of the fingers 46 by compression surface 57 and the force applied to the convex surface portions 51 by the outer surface 77 of the cable 20 causing the fingers 46 to deform to turn the prongs 43a and 43b of each prong pair 43 toward one another until their tips touch as shown in FIG. 5. The prongs 43a and 43b of each prong pair will thus securely engage and hold the braided outer conductor 73 therebetween. Inwardly convex surface portion 51 between the contact prongs in each prong pair acts somewhat as a pivot mechanism to ensure that the prongs will turn toward one another as the assembly 10 is tightened.

As shown in FIGS. 4 and 5, the tips of the prongs 43a and 43b are cut in a manner to define facing edges 81a and 81b, respectively. When the tips of the two prongs in a prong pair come together, the edges 81a and 81b will come together at a point to help retain the braided outer conductor therebetween. The prongs are in compression against the braided outer conductor therebetween. Radial outward pressure of the cable 20 against each base 51 will maintain a bias of the corresponding prongs toward each other and in compression against the braided outer conductor therebetween. The prongs are formed from metal having resilient spring properties. They deflect resiliently when biased in compression against the braided outer conductor and store resilient spring energy to maintain compression against the braided outer conductor, whereby a reliable electrical connection is established despite some fluctuation of the compression.

The cable termination member 10 of the present invention thus automatically terminates the braided outer conductor 73 of the cable 20 when the cable is mounted to panel 22. A separate termination fixture is not required as in prior apparatus. Furthermore, the prongs 43a and 43b are connected to the braided outer conductor of the cable at a plurality of locations around the circumference of the cable rather than at only a few locations as in many prior devices, resulting in a more reliable grounding of the outer shielding conductor of the cable.

As best shown in FIG. 1, the sidewall of aperture portion 21a of housing 12 has a raised rib 82 extending longitudinally thereon. Rib 82 is adapted to be received within a longitudinal groove 83 on the outer surface of compression member 16. Rib 82 and groove 83 comprise keying means for preventing rotation of the compression member as it is urged into the housing 12 to prevent damage to the flexible termination member 14 during assembly of the apparatus.

While what has been described constitutes a presently preferred embodiment, it should be understood that the invention can take numerous other forms. For example, the prongs can be positioned on the termination member or spaced from one another in ways other than described herein without departing from the invention. Because the invention can take other forms, it should be understood that the invention is to be limited only insofar as is required by the scope of the following claims.

I claim:

1. Apparatus for terminating an outer conductor of an electrical cable comprising:
    a housing having a cylindrical aperture for receiving a cable to be terminated;
    an annular termination member positioned within said housing aperture and surrounding the space to be occupied by at least a portion of said cable, said termination member having a plurality of pairs of electrically conductive contact prongs positioned around the circumference of said termination member and extending inwardly toward said cable space;
    a compression member having a compression surface for engaging said termination member; and
    means for urging said compression member into said housing aperture between the sidewall of said aperture and said termination member, said compression surface engaging said termination member and compressing said termination member inwardly for driving said plurality of electrically conductive contacts into said cable and into electrical contact with said outer conductor;
    wherein said compression surface comprises an annular, tapered compression surface for compressing said termination member inwardly by an increasingly greater extend as said compression member is urged into said housing aperture by said urging means for driving said plurality of electrically conductive contact prongs into said cable;

and wherein said termination member includes a plurality of curved surface portions to be engaged by the outer surface of said cable and by said compression surface during compression of said termination member inwardly for deforming said termination member to turn the prongs of each pair of prongs toward one another to retain said outer conductor therebetween.

2. Apparatus mounting a cable to a panel and for simultaneously terminating an outer conductor of said cable, comprising:

a housing having an aperture extending axially therethrough for receiving said cable;

means for mounting said housing to said panel with said housing aperture aligned with an aperture in said panel;

a cable extending through said housing aperture and said panel aperture, said cable having an outer conductor to be terminated;

an annular termination member positioned within said housing aperture and surrounding said cable, said termination member including an outer surface and having a plurality of pairs of electrically conductive prongs extending substantially inwardly toward said cable;

an annular compression member having an internal, tapered, compression surface;

said termination member includes curved surface portions engaged by the outer surface of said cable and by said compression surface for deforming said termination member for causing the prongs of each prong pair to turn toward one another to retain said outer conductor therebetween.

3. Apparatus for mounting a cable to a panel and for simultaneously terminating an outer conductor of said cable, comprising;

a housing having an aperture extending axially therethrough for receiving said cable;

means for mounting said housing to said panel with said housing aperture aligned with an aperture in said panel;

a cable extending through said housing aperture and said panel aperture, said cable having an outer conductor to be terminated;

an annular termination member positioned within said housing aperture and surrounding said cable, said termination member including an outer surface and having a plurality of electrically conductive prongs extending substantially inwardly toward said cable;

an annular compression member having an internal, tapered, compression surface;

a closure member threadably attached to said housing and provided for closing said housing, said closure member including a drive surface for urging said compression member into said housing aperture between the outer surface for said termination member and the sidewall of said housing aperture when said closure member is attached to said housing, said tapered compression surface engaging the outer surface of said termination member as it is urged into said housing aperture to compress said termination member inwardly to drive said plurality of prongs into said cable and into electrical contact with said outer conductor for terminating said outer conductor;

and further including means for preventing rotation of said compression member as said closure member is threaded onto said housing and said compression member is urged into said housing aperture.

4. The apparatus of claim 14 wherein said rotation-preventing means comprises a longitudinal rib on the sidewall of said housing aperture and a longitudinal groove on the outer surface of said compression member for engaging said rib to prevent rotation of said compression member.

* * * * *